United States Patent [19]
Gust et al.

[11] Patent Number: 5,925,447
[45] Date of Patent: *Jul. 20, 1999

[54] PERMANENT ANTISTATIC COATING AND COATED POLYMERIC FILM

[75] Inventors: Stephen J. Gust; Ronald S. Caines, both of Greenville, S.C.

[73] Assignee: Mitsubishi Polyester Film, LLC, Greer, S.C.

[ * ] Notice: This patent is subject to a terminal disclaimer.

[21] Appl. No.: 08/683,336

[22] Filed: Jul. 18, 1996

[51] Int. Cl.⁶ .......................... B32B 27/08; B32B 27/18; B32B 27/30; B32B 27/36

[52] U.S. Cl. .......................... 428/219; 428/331; 428/341; 428/412; 428/476.3; 428/483; 428/515; 428/520; 428/522; 428/910; 427/322; 427/331; 427/371; 427/372.2; 427/385.5; 427/393.5; 264/289.3; 264/289.6; 264/290.2; 430/528; 430/529; 430/531; 430/536

[58] Field of Search ...................................... 428/323, 331, 428/480, 483, 910, 219, 341, 412, 476.3, 515, 520, 522; 430/527, 528, 531, 532, 533, 534, 535, 536, 529; 427/322, 331, 371, 372.2, 385.5, 393.5; 264/289.3, 289.6, 290.2

[56] References Cited

U.S. PATENT DOCUMENTS

| | | | |
|---|---|---|---|
| 3,322,553 | 5/1967 | Seifried et al. | 117/7 |
| 4,214,035 | 7/1980 | Heberger | 428/340 |
| 4,302,505 | 11/1981 | Heberger | 428/341 |
| 4,642,263 | 2/1987 | Culbertson | 428/336 |
| 5,310,591 | 5/1994 | Dodge et al. | 428/195 |
| 5,310,595 | 5/1994 | Ali et al. | 428/206 |
| 5,518,809 | 5/1996 | Henry et al. | 428/327 |
| 5,709,926 | 1/1998 | Gust | 428/206 |

FOREIGN PATENT DOCUMENTS

| | | |
|---|---|---|
| 0512 540 A1 | 5/1992 | European Pat. Off. . |
| 1411564 | 10/1975 | United Kingdom . |
| 2012777 | 8/1979 | United Kingdom . |

OTHER PUBLICATIONS

Derwent Abstract No. 88–087272 of JP63037167 of Dainippon Ink & Chem.

"Principals of Polymerization" George Odian, 2nd ed., John Wiley & Sons.

*Primary Examiner*—Vivian Chen

[57] ABSTRACT

A thermoplastic film coated with a permanent antistatic composition to form an antistatic coating thereon, and a method for priming a thermoplastic film with the antistatic composition. The antistatic composition comprises: from 2 to 11% by weight of an antistatic copolymer; from 0 to 0.45% by weight of an antistatic compound; from 0.25 to 2% by weight glycidoxy silane; from about 0.3 to 2% by weight spherical silica particles having an average diameter of 10–100 nanometers; and water, or a mixture or water and organic solvent, wherein the total weight percent of all components equals 100%.

46 Claims, No Drawings

PERMANENT ANTISTATIC COATING AND COATED POLYMERIC FILM

BACKGROUND OF THE INVENTION

1. Field of the Invention

This invention is directed to an improved permanent antistatic polymeric film, a method of producing such a film, and the antistatic coating composition. In particular, the present invention is directed to an antistatic coating which, when applied to a polymeric film, yields a film having improved permanent antistatic properties.

2. Prior Art

The growth of packaging, reprographic, microfilm and magnetic markets has significantly increased the utilization of plastic film materials in these markets. In particular, biaxially oriented plastic film made from polyethylene, polypropylene, nylon, polyester, polystyrene and polycarbonate, may be employed for these purposes. One of the problems associated with the use of such biaxially oriented films is the tendency of these materials to accumulate an electrostatic charge on the surface as a result of handling or processing of the film, especially at low relative humidity. The nonconductive nature of most polymeric films allows for an accumulation of high electrostatic potential. These electrostatic charges are most pronounced during surface separation of the film, such as winding or unwinding, or further processing the film over rolls and similar equipment. The electrostatic charges attract not only dust and other contaminants, but additionally attract other film, such as the next layer of film on a roll of film, causing film blocking during processing. While slip agents can be added to polymeric films to reduce blocking, they do not reduce or eliminate the electrostatic charges. To overcome this serious problem, antistatic films have been developed. Antistatic films are usually formed by the topical treatment of an antistatic coating onto one or both surfaces of the film. Many of the coatings have successfully reduced the electrostatic properties of the film to satisfactorily low levels. However, the coatings are easily removed (i.e. temporary rather than permanent) from the surface by routine contact (rub-off) or by using organic solvents or water during further processing of the film (dissolve-off).

Various antistatic coatings are known in the prior art. U.S. Pat. Nos. 4,214,035 and 4,302,505 to Heberger, disclose a polymeric film having a latex coating comprising a nitrate salt and a polyacrylate or acrylic terpolymer. While this antistatic coating has suitable slip, the antistatic coating is not permanent and can easily be removed in a hot aqueous bath and can be rubbed off.

Another antistatic coated film is disclosed in U.S. Pat. No. 4,642,263 to Culbertson which discloses an antistatic film having a polymeric binder and a quaternary ammonium salt. A film coated with such an antistatic coating composition has good clarity, good slip properties, and remarkably good antistatic properties, but the antistatic properties can be substantially reduced by submitting the film to a hot aqueous bath.

European Patent Application 0-512,540, published Nov. 11, 1992 discloses antistatic coated film which is not easily removed in a hot aqueous bath. The antistatic coating composition is a copolymer which is comprised of (on a dry weight basis): 1) from 60–85% by weight of a quaternary salt of either alkylamino acrylate or alkylamino acrylamide; 2) from 15–40% by weight of one or more acrylates; and 3) from 0–10% by weight of a suitable crosslinker. In addition, the inclusion of an antistatic compound to the antistatic coating composition described above has been found particularly useful in maintaining antistatic properties under manufacturing conditions. Suitable antistatic compounds for use include any long chain quaternary ammonium compound. However, the resulting film is slightly hazy, thus its end use for layout montage could be improved.

Another problem associated with prior antistatic films is that many of the antistatic coatings cause blocking. Blocking occurs when the antistatic layer on the film has a coefficient of friction sufficiently high that one layer of the film does not easily slip over another, or over rollers, or other equipment. Thus, there is a need to develop an antistatic coating which has the ability to remain bonded with the surface of the film, i.e., not rubbed off, as well as developing an antistatic coated film which has a coefficient of friction sufficiently low so that the film has acceptable slip properties, and developing an antistatic film which has no, or only slight haze.

SUMMARY OF THE INVENTION

The present invention, in the broadest sense, relates to a permanent antistatic coating composition which is comprised of: a) from about 2 to about 11% by weight of an antistatic copolymer; b) from 0 to about 0.45% by weight of an antistatic compound; c) from about 0.25 to 2% by weight of glycidoxy silane; d) from about 0.3 to 2% by weight spherical silica particles having an average diameter of about 10–100 nanometers; and e) water, or a mixture of water and organic solvent, wherein the total weight percent of a–e equals 100%.

Said antistatic copolymer is a copolymer of: 1) from about 60% by weight to about 85% by weight of a quaternary salt of an alkylamino acrylamide or an alkylamino acrylate, 2) from about 5% by weight to about 40% by weight of one or more acrylates, and 3) from 0 to about 10% by weight of a crosslinker, wherein the total of the weight percentages of components 1, 2, and 3 equals 100%.

In the broadest sense, the present invention also comprises a polymeric film having a permanent antistatic coating composition thereon, wherein the permanent antistatic coating, on a dry weight basis, is comprised of: a) from about 31 to about 96% by weight of an antistatic copolymer; b) from 0 to about 15% by weight of an antistatic compound; c) from about 1 to 47% by weight of glycidoxy silane; d) from about 2 to 48% by weight spherical silica particles having an average diameter of about 10–100 nanometers, wherein the total weight percent of a–d equals 100%.

In the broadest sense of the present invention, there is also disclosed a method for antistatically priming a polymeric film comprising: i) coating said film with an aqueous based permanent antistatic composition comprised of from about 2 to about 11% by weight of said antistatic copolymer; from 0 to about 0.45% by weight of an antistatic compound; from about 0.25 to 2% by weight of glycidoxy silane; from about 0.3 to 2% by weight spherical silica particles having an average diameter of about 10–100 nanometers; and water, or a mixture of water and organic solvent, wherein the total weight percent of all components equals 100%; and ii) drying said coating on said film.

DESCRIPTION OF THE PREFERRED EMBODIMENTS

The present invention is applicable to any polymeric film capable of acting as a substrate for the primer coating. In particular, the present invention is applicable to polymeric films such as those made from polyamides exemplified by nylon; polyolefins such as polypropylene and polyethylene;

polyester such as polyethylene terephthalate; polyacetal; polycarbonate; and the like. The invention is particularly applicable to polyester, but is not limited to polyethylene terephthalate or polybutylene terephthalate. The present invention can also utilize copolyesters such as polyethylene terephthalate isophthalate. Generally any polyester film based on a polymer resulting from the polycondensation of a glycol or diol with a dicarboxylic acid (or the ester equivalents) such as terephthalic acid, isophthalic acid, sebacic acid, malonic, adipic, azelaic, glutaric, suberic, succinic, and the like, or mixtures of these, can be employed in the present invention. Suitable glycols could be ethylene glycol, diethylene glycol, polyethylene glycol, and polyols such as butanediol, and the like.

Any of the above polymeric films can contain conventional additives such as antioxidants, delusterants, pigments, fillers such as silica, calcium carbonate, kaolin, titanium dioxide, u. v. stabilizers, plasticizers, etc., all of which are well known in the art.

Additionally, the polymeric film may comprise a polymeric laminate such as a polymer-polymer laminate like polyester-polyolefin, for example, or a polymer-metallic laminate such as polyester-aluminum, or a polymeric paper laminate, or the like. The preferred film is a polyethylene terephthalate (polyester) film.

The film may be produced by manufacturing techniques well known in the art. For example, polyester film may be made by melt extruding polyester as an amorphous sheet onto a polished revolving casting drum to form a cast sheet of the polymer. Thereafter, the polyester sheet is actually stretched or drawn in one or more directions, to orient the film and provide it with sufficient physical properties. For example, the film may be drawn in the direction of extrusion (longitudinal), or perpendicular to the direction of extrusion (transverse). Biaxially oriented film is drawn in both directions. For polyester film, the amount of stretching, to impart strength and toughness to the film, generally ranges from about 2.5 to about 5.0 times the original cast sheet dimensions in one or more directions. The stretching operations for any polymeric film are generally carried out at temperatures in the range from about the second order transition temperature of the polymer to below the temperature at which the polymer softens and melts.

Where necessary, the film is heat treated, after stretching, for a period of time necessary to crystallize the polymer film. Crystallization imparts stability and good tensile properties to the film. When polyethylene terephthalate film is heat treated, it is subjected to a heat setting temperature in the range of between 190° C. and 240° C.

The antistatic coating composition of the present invention is preferably in the form of an aqueous dispersion but may also be in an organic solvent solution such as alcohol, for example, or a mixture of these. An aqueous dispersion is preferred for both environmental reasons and health of the employees. The permanent antistatic coating composition may be applied in-line during the film manufacturing process (the preferred method) or off-line after the film manufacturing process. For in-line coating, the coating composition may be applied in the pre-draw stage, i.e. before the film is stretched in any direction, as disclosed in British Patent No. 1,411,564, or between stages, if a biaxially oriented film is being produced, as disclosed, for example, in U.S. Pat. No. 4,214,035; or the coating composition may be applied post draw, but before heat setting as disclosed, for example, in U.S. Pat. No. 3,322,553. In one preferred embodiment, the coating is applied in-line, after the film is uniaxially stretched, but before the film is stretched in the opposite direction.

Regardless of when the permanent antistatic coating composition is applied to the polymeric film, it is preferred to make the surface of the polymeric film more receptive to bonding with the permanent antistatic coating composition. Such surface treatments are well known in the prior art and corona treatment is the most popular. For polyester, corona treatment of about 3–7 watts/ft$^2$/min. is typical.

The film may be coated with the permanent antistatic coating composition by any well known technique employed in the art. For example, the coating may be applied by a roller, by spray coating, by slot coating, by immersion coating, reverse gravure roll coating, or gravure roll coating.

Once the permanent antistatic coating composition is applied to the film, the aqueous portion (and/or organic solvent) of the composition evaporates leaving a dried coating on the film comprised of a) from about 31 to about 96% by weight of an antistatic copolymer; b) from 0 to about 15% by weight of an antistatic compound; c) from about 1 to 47% by weight of glycidoxy silane; d) from about 2 to 48% by weight spherical silica particles having an average diameter of about 10–100 nanometers, wherein the total weight percent of a–d equals 100%. The coating composition, when applied to the film, is such to yield a final dry coating on a weight basis, of from 0.00305 to 0.400 grams/square meter.

Although water is the preferred carrier for the coating composition, suitable water/organic solvents could also be employed. Suitable organic solvents may include alcohols, chlorinated hydrocarbons, esters, ethers, glycol and ether/ester derivatives, ketones, and dimethyl formamide.

The antistatic copolymer promotes conductivity of the coating. It may be used in an amount of from about 2% by weight to about 11% by weight solids, based on the aqueous (and/or solvent) coating. The antistatic copolymer is a copolymer of: 1) from about 60% by weight to about 85% by weight of a quaternary salt of an alkylamino acrylamide (AAA) or an alkylamino acrylate (AAL); 2) from about 5% by weight to about 40% by weight of one or more acrylates; and 3) from 0 to about 10% by weight of a crosslinker, wherein the total of the weight percentages of components 1, 2, and 3 equals 100%.

Quaternary salts of alkylamino acrylates (AAL)which may be used in embodiments of the present invention may be represented by the generic formula:

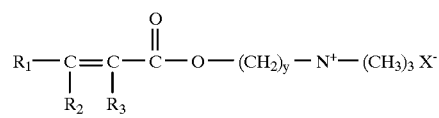

wherein $R_1$, $R_2$ and $R_3$ may be the same or different and may be hydrogen, or an alkyl containing 1–8 carbon atoms; y is 1 to 8; and X may be anions selected from halogens such as chloride; sulfates; sulfonates; alkyl sulfates such as methyl sulfate; alkyl sulfonates such as methyl sulfonate; carbonates; alkyl carbonates such as methyl carbonate; nitrates; phosphates; alkyl phosphates; and the like, or mixtures thereof.

Preferably, $R_1$ and $R_2$=hydrogen, $R_3$=methyl, y=2 and X=methyl sulfate, forming the dimethyl sulfate quaternary salt of dimethylaminoethyl methacrylate (CA5 Registry #6891-44-7), sold under the registered trademark MADQUAT Q5 by Norsolac, Inc. of N.C.

The quaternary salts of alkylamino acrylamides (AAA) which may be used in the present invention may be represented by the generic formula:

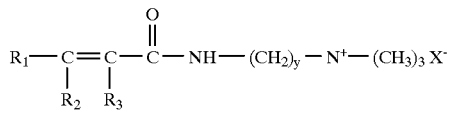

wherein $R_1$, $R_2$ and $R_3$ may be the same or different and may be hydrogen, or an alkyl containing 1–8 carbon atoms; y is 1 to 8; and X may be anions selected from halogens such as chloride; sulfates; sulfonates; alkyl sulfonates such as methyl sulfonate; carbonates; alkyl carbonates such as methyl carbonate; nitrates; phosphates; alkyl phosphates; and the like, or mixtures of these. The quaternary salts of the alkylamino acrylamides (AAA) may be produced in accordance with U.S. Pat. No. 4,910,325 issued to Shen, et al.

Suitable acrylates for use in the antistatic copolymer may be methyl acrylate, ethyl acrylate, propyl acrylate, butyl acrylate, hexyl acrylate, octyl acrylate, 2-ethyl-hexyl acrylate, methylmethacrylate, ethyl methacrylate, propyl methacrylate, and the like. More than one acrylate may be employed. Preferably, ethyl acrylate and/or methyl methacrylate are employed.

Suitable crosslinkers for use in the antistatic copolymer may be self crosslinking components such as in N-methylolacrylamide and N-methylol methacrylamide, melamine or urea formaldehyde crosslinked with one or more of itaconic acid, itaconic anhydride, acrylic acid, allyl alcohol, maleic acid, maleic anhydride, acrylamide or methacrylamide crosslinked with melamine formaldehyde or urea formaldehyde, aziridines, glycoluril formaldehyde, benziguanamines, acrylamido glycolic acid, bis-acrylamide glycol, glyoxal, formaldehyde, diacrylamide acetic acid or other suitable crosslinkers. The preferred crosslinker of the present invention is N-methylolacrylamide.

The antistatic compound provides additional conductivity to the coating, and has been found particularly useful under manufacturing conditions. Suitable antistatic compounds for use include any long chain quaternary ammonium compound. The preferred quaternary ammounium compound of the present invention is stearamidopropyldimethyl-β-hyroxyethylammonium nitrate.

The glycidoxy silane may be glycidoxypropyltrimethoxysilane or glycidoxypropylmethyldiethoxysilane, or generally any glycidoxy silane represented by the formula X-Y-Si-$R_1R_2R_3$, i.e.,

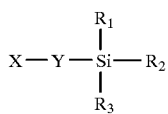

where X is a glycidoxy group, Y is an alkylene group, such as methylene, ethylene, propylene, etc., $R_1$ and $R_2$ are hydrolyzable groups, such as methoxy, ethoxy, acetoxy, and the like, and $R_3$ may be a hydrolyzable group or a non-hydrolyzable group. If $R_3$ is a non-hydrolyzable group, it may be an alkyl such as methyl, ethyl, and the like, or aryl such as phenyl, naphthyl, and the like. These silanes may possess water solubility or water dispersibility, as well as solvent solubility/dispersibility. The amount of glycidoxy silane employed is from about 0.25 to 2% by weight, based on the weight of the wet coating. Haze is significantly improved over the antistatic composition given in European Patent Application 0-512,540 for the entire range of silane addition.

The silica particles are necessary to prevent blocking. The amount and size of silica particles employed are based on the percentage by weight coating employed, the particle diameter and the particle distribution. Most preferably, the particles are approximately spherical in nature (for the purposes of this invention, the particles are not perfect spheres, but nearly so and thus considered as spherical). Generally, below about 0.3% by weight silica based on the total wet weight of the coating composition is not adequate for preventing blocking and thus preventing further processing of the film. On the other hand, more than about 2% by weight silica particles may begin to negatively effect film characteristics such as haze and adhesion. Preferably about 0.7% by weight silica is optimal. The silica particle size is in the nominal range from 10–100 nanometers in diameter. While larger particles can be employed, the average size distribution should be within the stated range to provide optimal results. If the average size distribution is below the stated range, the particles become so fine that they are incapable of significantly preventing blocking. It is preferred to have a narrow size range distribution between 20–60 nanometers. The amount of silica employed is dependent on the particle size employed, e.g., best results can be obtained with smaller amounts of silica when the nominal particle size is large, and when the nominal particle size is near the lower end of the stated range, larger amounts of the silica particles should be used. In addition, in the preferred embodiment a colloidal silica was chosen whose particles have positively charged surfaces in order to prevent flocculation of the cationic antistatic copolymer.

In the preferred embodiment the coating composition is aqueous based. The antistatic copolymer can be prepared by polymerization by a conventional polymer synthesis at a temperature from about 40° to 60° C. In practice, the three components (AAA/AAL, acrylate(s), and crosslinker) and one or more various surfactants are slowly metered into an aqueous solution. The various surfactants may be anionic or nonionic surfactants. Suitable nonionic surfactants are alkylphenol ethoxylates, such as octyl phenol ethoxylate available from Rohm & Haas Co. in Philadelphia, Pa., or from Union Carbide Corp. in NY, N.Y.; or BASF in Spartanburg, S.C. Suitable anionic surfactants include sodium lauryl sulfate or sodium dodecylbenzene sulfonate. The aqueous solution may also contain a redox initiator system. Typical initiators for polymerization reactions are peroxide compounds such as lauryl peroxide, benzoyl peroxide, methyl ethyl ketone peroxide, and the like.

As in all polymerization reactions, water quality is an important consideration. Deionized water should be used since the presence of certain multivalent ions in uncontrolled concentrations can interfere with both the initiation process and the action of any emulsifier.

As the comonomers are slowly metered into the water containing the surfactants and the initiator, copolymerization of the three comonomers begins, thereby forming particles of the coating composition.

Near the completion of the copolymerization reaction, the reaction mixture will comprise small particles suspended in water due to the nonionic and anionic surfactants. This mixture may typically have a solids level of from 25 to 30 percent and thus it will be necessary to dilute it with water or a solvent to achieve a more usable range for coating. A typical coating range for a diluted coating composition is 2–16% solids by weight with the remainder being water or a water/organic solvent. Higher solids levels will result in agglomeration of the particles into larger particles or clumps of particles which will tend to precipitate from the solution as grit. Lower solids level creates a burden on the process to adequately dry all the coating composition necessary to achieve the desired solids level hereinafter described.

The above described polymerization process is well known and described in "Principles of Polymerization" by George Odian, second edition, published by John Wiley and Sons.

To the antistatic copolymer composition which must be diluted with water or solvent as described above, the antistatic compound, glycidoxy silane and silica particles may be added. The preferred solids level is such as to yield a final dry coating on a weight basis of from 0.00305 to 0.400 g/m2 (grams per square meter).

GENERAL INFORMATION

Suitable antistatic films are those films in which the surface resistivity is less than $10^{12}$ ohms/square and preferably from approximately $10^9$ to $10^{11}$ ohms/square. Films having a surface resistivity higher than this value do not adequately dissipate static charge. Films having a surface resistivity less than $10^9$ ohms are considered to be conductive or semiconductive, but are not economically beneficial for most antistatic applications.

The surface resistivity, in ohms/square, was determined according to ASTM D-257-66 at 23° C. and 50% relative humidity. The surface resistivity was determined by a Keithley Model 6105 capable of measuring from $10^3$ to $5 \times 10^{18}$ ohms/square at 50% relative humidity.

EXAMPLE 1

Two different film thicknesses (48 gauge and 300 gauge) of Hostaphan®4000 polyester film made by Hoechst Diafoil Company at Greer, S.C. were employed. Each film described herein was compared to film coated with a control antistatic coating composition consisting of the invention of the antistatic coating composition disclosed in European Patent Application 0,512,540, subsequently modified by the addition of an antistatic compound. The control antistatic coating was based upon a 4.0% by weight aqueous coating composition. More specifically, 3.85% by weight of the coating composition was an antistatic copolymer in the form of a quaternized methacrylate copolymer (sold by ABCO Industries) and 0.15% by weight of the coating composition was the antistatic compound stearamidopropyldimethyl-β-hydroxyethylammonium nitrate (sold by Cyanamid as Cyastat® SN). Each film thickness was tested using a coating composition formed by the addition to said control antistatic coating composition of 1% by weight of coating glycidoxy silane (3- glycidoxypropyltrimethoxy silane)(sold by Dow Corning as Z-6040). Lastly, the 300 gauge film was also coated with a composition comprised of the control antistatic coating with an addition of 0.5% on weight of coating glycidoxy silane. Each of these samples were tested for surface resistivity (per ASTM D-257-66), static and kinetic coefficients of friction (COFs and COFk, respectively)(per ASTM 1894), total haze (per ASTM 1003, Gardner® Hazemeter), coating pattern severity, tape adhesion, and solvent wipe. Coating pattern severity was subjectively determined by visual inspection of the coated film surface against a black background. Although it is preferable to produce film which contains no visible coating patterns, the presence of slight visible patterns is generally acceptable. Tape adhesion was determined using an Instron® machine. One 3" strip of 1" 3M 616 tape was attached to each sample, and the force required to remove the tape from the sample at a 180° pull angle was determined. Tape adhesion represents the average force required to separate the surfaces, based on 3 replicates. Solvent wipe resistance was determined using Anchor Film Kleen® #7065 as solvent. A swatch of cotton nonwoven saturated with Anchor Film Kleen® #7065 was employed to rub the surface of the film in a circular pattern for 10 seconds using light pressure. The film was then allowed to dry for 1 minute at room temperature, at which time the film surface was visually inspected for disturbances in the coating, such as dissolved patches or smears. The results are set forth in Table I.

As shown in Table I, the addition of glycidoxy silane improves total haze and coating patterns for both film thicknesses, without detrimentally affecting surface resistivity or solvent resistance. However, the addition of glycidoxy silane increased the coefficients of friction for the samples, causing 2 of the 3 samples to "block" during testing.

TABLE I

| Sample No. | Film Gauge | Coating Weight (lbs/ft2) | Surface Resistivity 20% R.H. (ohms/sq.) | Surface Resistivity 50% R.H. (ohms/sq.) | COFs A/A[1] | COFs A/B[2] | COFk A/A[1] | COFk A/B[2] | Total Haze | Coating Patterns | Tape Adh. (lbs/in) | Solvent Wipe |
|---|---|---|---|---|---|---|---|---|---|---|---|---|
| 3.85% Antistatic Copolymer + 0.15% Cyastat SN (48 Gauge Control): | | | | | | | | | | | | |
| 1 | 48 | $7.7 \times 10^{-6}$ | $1.9 \times 10^{15}$ | $1.9 \times 10^{11}$ | 0.56 | 0.69 | 0.52 | 0.80 | 2.14 | Bad | 1.07 | Smears |
| 3.85% Antistatic Copolymer + 0.15% Cyastat SN + 1% Glycidoxy Silane | | | | | | | | | | | | |
| 2 | 48 | $8.8 \times 10^{-6}$ | $7.4 \times 10^{14}$ | $3.9 \times 10^{10}$ | 1.10 | 2.09 | 0.64 | B1[3] | 0.31 | Good | 1.53 | Slight smear |
| 3.85% Antistatic Copolymer + 0.15% Cyastat SN (300 Gauge Control) | | | | | | | | | | | | |
| 3 | 300 | $4.6 \times 10^{-6}$ | $3.5 \times 10^{14}$ | $2.5 \times 10^{11}$ | 0.50 | 0.46 | 0.51 | 0.53 | 1.05 | Bad | 1.48 | Almost clear |
| 3.85% Antistatic Copolymer + 015% Cyastat SN + 1.0% Glycidoxy Silane: | | | | | | | | | | | | |
| 4 | 300 | $7.6 \times 10^{-6}$ | $3.3 \times 10^{14}$ | $7.2 \times 10^{10}$ | 0.63 | 0.64 | 0.62 | 0.42 | 0.57 | Slight | 1.35 | Slight smears |
| 3.85% Antistatic Copolymer + 0.15% Cyastat SN + 0.50% Glycidoxy Silane: | | | | | | | | | | | | |
| 5 | 300 | $7.3 \times 10^{-6}$ | $2.3 \times 10^{14}$ | $1.0 \times 10^{11}$ | 0.56 | 1.52 | 0.52 | B1[3] | 0.53 | Slight | 1.27 | Slight smears |

[1]A/A is the coefficient of friction based on coated film to coated film
[2]A/B is the coefficient of friction based on coated film to uncoated film
[3]B1 indicates that the sample blocked

EXAMPLE 2

Eleven different coating compositions were examined having various levels of glycidoxy silane and silica particles within the coating composition described in Example 1. The silica particles reduce coefficient of friction by their inclusion in the composition. The silica particles project from the surface of the film, creating small air spaces between each layer of film when it is wound upon itself, as in a roll, thereby reducing the friction generated when the layers of said film subsequently slide over each other, as is the case during unwinding. This formation of air spaces also aids in reducing static charge build-up during later film processing. The particular silica employed was Nalco® 1056 (sold by Nalco Chemical Co.) The results of this example are set forth in Table II. None of the eleven samples had any detectable coating pattern thereon. Moreover, as shown in Table II, all continued to demonstrate excellent total haze, surface resistivities, and coefficients of friction, particularly when compared to the control set forth in Table I. Each film employed here was 48 gauge Hostaphan® 4000.

e) water, wherein the total weight percent of a–e equals 100%.

2. The coating composition of claim 1, wherein the quatemary salt a)1) is a quatemary salt of an alkylamino acrylate of the general formula

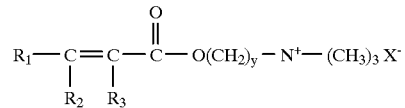

wherein $R_1$, $R_2$ and $R_3$ are the same or different and are hydrogen or an alkyl group containing 1–8 carbon atoms;

TABLE II

| | Coating Composition (weight % of aqueous coating) | | | | Results | | | | | | | |
|---|---|---|---|---|---|---|---|---|---|---|---|---|
| Sample | Antistatic Copolymer | Cyastat SN | Glycidoxy Silane | Silica | Surf. Res. 50% RH (Ω/Sq) | COFs A/A | COFs A/B | COFk A/A | COFk A/B | Total Haze | Tape Adhes. (lbs/in) | Coat Weight (lb/ft²) |
| 1 | 3.85 | 0.15 | 0.5 | 0.7 | $2.3 \times 10^{11}$ | .55 | .44 | .51 | .48 | 0.67 | 1.39 | $7.4 \times 10^{-6}$ |
| 2 | 3.85 | 0.15 | 0.4 | 0.4 | $1.4 \times 10^{11}$ | .47 | .38 | .51 | .62 | 0.63 | 1.47 | $9.2 \times 10^{-6}$ |
| 3 | 3.85 | 0.15 | 0.6 | 0.4 | $2.2 \times 10^{11}$ | .56 | .43 | .53 | .53 | 0.64 | 1.46 | $7.3 \times 10^{-6}$ |
| 4 | 3.85 | 0.15 | 0.4 | 1.0 | $3.4 \times 10^{11}$ | .55 | .36 | .53 | .53 | 0.71 | 1.52 | $8.0 \times 10^{-6}$ |
| 5 | 3.85 | 0.15 | 0.6 | 1.0 | $2.7 \times 10^{11}$ | .40 | .39 | .57 | .48 | 0.66 | 1.48 | $7.1 \times 10^{-6}$ |
| 6 | 3.85 | 0.15 | 0.5 | 0.7 | $2.0 \times 10^{11}$ | .56 | .43 | .53 | .48 | 0.64 | 1.47 | $8.4 \times 10^{-6}$ |
| 7 | 3.85 | 0.15 | 0.4 | 0.7 | $2.7 \times 10^{11}$ | .52 | .37 | .54 | .48 | 0.61 | 1.48 | $7.6 \times 10^{-6}$ |
| 8 | 3.85 | 0.15 | 0.6 | 0.7 | $2.2 \times 10^{11}$ | .54 | .42 | .53 | .47 | 0.63 | 1.43 | $8.7 \times 10^{-6}$ |
| 9 | 3.85 | 0.15 | 0.5 | 0.4 | $1.9 \times 10^{11}$ | .56 | .40 | .57 | .52 | 0.50 | 1.43 | $7.1 \times 10^{-6}$ |
| 10 | 3.85 | 0.15 | 0.5 | 1.0 | $3.0 \times 10^{11}$ | .51 | .40 | .52 | .50 | 0.56 | 1.47 | $7.9 \times 10^{-6}$ |
| 11 | 3.85 | 0.15 | 0.5 | 0.7 | $2.4 \times 10^{11}$ | .59 | .39 | .56 | .49 | 0.68 | 1.56 | $8.0 \times 10^{-6}$ |

Thus, it is apparent that there has been provided, in accordance with the invention, an antistatic coating, a film having an antistatic coating thereon, and a method of applying an antistatic coating to a film that fully satisfies the objects, aims and advantages supported above. While the invention has been described in conjunction with the specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A permanent antistatic coating composition for polymeric films, said coating composition comprising:
   a) from about 2 to 11% by weight of an antistatic copolymer, wherein said antistatic copolymer is a copolymer of:
      1) from about 60% by weight to about 85% by weight of a quaternary salt of an alkylamino acrylamide or alkylamino acrylate;
      2) from about 5% by weight to about 40% by weight of one or more acrylates; and
      3) from 0 to about 10% by weight of a crosslinker; wherein the total weight percent of components 1, 2, and 3 equals 100%;
   b) from about 0 to 0.45% by weight of an antistatic compound;
   c) from about 0.25 to 2% by weight glycidoxy silane;
   d) from about 0.3 to 2% by weight spherical silica particles having an average diameter of about 10–100 nanometers; and y=1 to 8; and X is an anion selected from the group consisting of halogens, sulfates, sulfonates, alkyl sulfates, alkyl sulfonates, carbonates, alkyl carbonates, nitrates, phosphates, alkyl phosphates, and mixtures of these.

3. The coating composition of claim 2, wherein $R_1$ and $R_2$ are hydrogen; $R_3$ is a methyl group; y is 2; and X is methyl sulfate.

4. The coating composition of claim 1, wherein the quatemary salt a)1) is a quatemary salt of an alkylamino acrylamide of the general formula

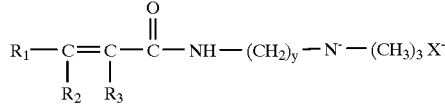

wherein $R_1$, $R_2$ and $R_3$ are the same or different and are hydrogen or an alkyl group containing 1–8 carbon atoms; y=1 to 8; and X is an anion selected from halogens, sulfates, sulfonates, alkyl sulfonates, carbonates, alkyl carbonates, nitrates, phosphates, alkyl phosphates, and mixtures of these.

5. The coating composition of claim 4, wherein $R_1$, $R_2$ and $R_3$ are hydrogen, y=3, and X is chloride.

6. The coating composition of claim 1, wherein said acrylates are selected from the group consisting of methyl acrylate, ethyl acrylate, propyl acrylate, butyl acrylate, methyl methacrylate, ethyl methacrylate, propyl methacrylate, hexyl acrylate, 2-ethyl-hexyl acrylate, octyl acrylate, and mixtures of these.

7. The coating composition of claim 1, wherein said crosslinker is selected from the group consisting of N-methylolacrylamide; N-methylol methacrylamide; melamine or urea formaldehyde crosslinked with one or more of itaconic acid, itaconic anhydride, acrylic add, allyl alcohol, maleic acid and maleic anhydride; acrylamide and methacrylamide crosslinked with melamine formaldehyde or urea formaldehyde; aziridines; glycoluril formaldehyde; benzoguanamines; acrylamido glycolic acid; bis-acrylamide glycol; glyoxal; formaldehyde; and diacrylamide acetic acid.

8. A polymeric film having permanent antistatic properties, said film comprising:
A) an oriented polymeric film; and
B) an effective amount of a coating on at least one side of said film, sufficient to provide antistatic properties to said film, said coating, on a dry weight basis, comprising:
a) from about 31 to 96% by weight of an antistatic copolymer, wherein said antistatic copolymer is a copolymer of:
1) from about 60% by weight to about 85% by weight of a quaternary salt of an alkylamino acrylamide or alkylamino acrylate;
2) from about 5% by weight to about 40% by weight of one or more acrylates; and
3) from 0 to about 10% by weight of a crosslinker; wherein the total weight percent of components 1, 2, and 3 equals 100%;
b) from about 0 to 15% by weight of an antistatic compound;
c) from about 1 to 47% by weight glycidoxy silane; and
d) from about 2 to 48% by weight spherical silica particles having an average diameter about 10–100 nanometers in diameter, wherein the total weight percent of a–d equals 100%.

9. The polymeric film of claim 8, wherein the quaternary salt a)1) is a salt of an alkylamino acrylate of the general formula

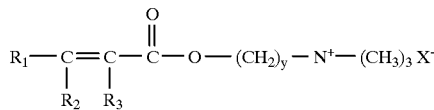

wherein $R_1$, $R_2$ and $R_3$ are the same or different and are hydrogen or an alkyl group containing 1–8 carbon atoms; y=1 to 8; and X is an anion selected from halogens, sulfates, sulfonates, alkyl sulfates, alkyl sulfonates, carbonates, alkyl carbonates, nitrates, phosphates, alkyl phosphates, and mixtures of these.

10. The polymeric film of claim 9, wherein $R_1$ and $R_2$ are hydrogen; $R_3$ is a methyl group; y is 2; and X is methyl sulfate.

11. A polymeric film according to claim 10 wherein at least one of the one ore more acrylates in the antistatic copolymer is ethyl acrylate and/or methyl methacrylate.

12. A polymeric film according to claim 11, wherein the antistatic copolymer is a copolymer of the quaternary salt, the ethyl acrylate and/or methyl methacrylate and, as crosslinker, N-methylolacrylamide.

13. A polymeric film according to claim 12 wherein the glycidoxy silane is glycidoxypropyltrimethoxysilane or glycidoxypropylmethyidiethoxysilane.

14. A polymeric film according to claim 13 which comprises, as an antistatic compound, stearamidopropyidimethyl-β-hydroxyethylammonium nitrate.

15. A polymeric film according to claim 14 wherein the spherical silica particles have positively charged surfaces.

16. The polymeric film of claim 8, wherein the quaternary salt a)1) is a salt of an alkylamino acrylamide of the general formula

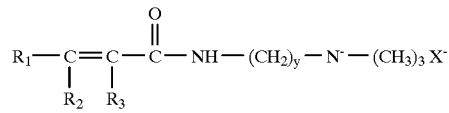

wherein $R_1$, $R_2$ and $R_3$ are the same or different and are hydrogen or an alkyl group containing 1–8 carbon atoms; y=1 to 8; and X is an anion selected from halogens, sulfates, sulfonates, alkyl sulfonates, carbonates, alkyl carbonates, nitrates, phosphates, alkyl phosphates, and mixtures of these.

17. The polymeric film of claim 16, wherein $R_1$, $R_2$ and $R_3$ are hydrogen, y=3, and X is chloride.

18. The polymeric film of claim 8, wherein said acrylates selected from the group consisting of methyl acrylate, ethyl acrylate, propyl acrylate, butyl acrylate, methyl methacrylate, ethyl methacrylate, propyl methacrylate, hexyl acrylate, 2-ethyl, hexyl acrylate, octyl acrylate, and mixtures of these.

19. The polymeric film claim 8, wherein said crosslinker is selected from the group consisting of N-methylolacrylamide; N-methylol methacrylamide; melamine or urea formaldehyde crosslinked with one or more of itaconic acid, itaconic anhydride, acrylic acid, allyl alcohol, maleic acid and maleic anhydride; acrylamide and methacrylamide crosslinked with melamine formaldehyde or urea formaldehyde; aziridines; glycoluril formaldehyde; benzoguanamines; acrylamido glycolic acid; bis-acrylamide glycol; glyoxal; formaldehyde; and diacrylamide acetic acid.

20. The polymeric film of claim 8, wherein said oriented polymeric film is selected from group consisting of polyester, polyolefin, polyamide, polyacetal, and polycarbonate.

21. The polymeric film of claim 20, wherein said film is biaxially oriented.

22. The polymeric film of claim 8, wherein said coating is on both sides of said polymeric film.

23. The polymeric film of claim 8, wherein said coating on said film is from 0.00305–0.400 g/m².

24. The polymeric film of claim 8, wherein said film has a surface resistivity of less than $1 \times 10^{12}$ ohms/square, and a static decay time of less than 2 seconds.

25. The polymeric film of claim 8, wherein the antistatic copolymer is a copolymer of a quatermary salt of an alkylamino acrylamide or alkyl amino acrylate, one or mor acrylates and a crosslinker.

26. A polymeric film according to claim 25 wherein the spherical silica particles have positively charged surfaces.

27. A polymeric film according to claim 26 wherein the coating comprises, as an antistatic compound, a long chain quatemary ammonium compound.

28. A polymeric film according to claim 8 wherein the glyddoxy silane is a compound of the formula

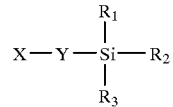

wherein
X is a glycidoxy group,

Y is an alkylene group, $R_1$ and $R_2$ are hydrolyzable groups and $R_3$ is a hydrolyzable group or a non-hydrolyzable group.

29. A polymeric film according to claim 28 wherein Y is methylene, ethylene or propylene, the hydrolyzable groups as $R_1$, $R_2$ and $R_3$ are methoxy, ethoxy or acetoxy and the non-hydrolyzable group as $R_3$ is methyl, ethyl, phenyl or naphthyl.

30. A polymeric film according to claim 29 wherein the oriented polymeric film is polyethylene terephthalate, polybutylene terephthalate or polyethylene terephthalate isophthalate.

31. A polymeric film according to claim 29 wherein the coating comprises, as an antistatic compound, a long chain quaternary ammonium compound.

32. A polymeric film according to claim 28 wherein the oriented polymeric film is polyester.

33. A polymeric film according to claim 28 wherein the spherical silica particles have positively charged surfaces.

34. A method for priming a polymeric film to provide permanent antistatic properties, comprising:
    A) coating a polymeric film with an effective amount of a permanent antistatic composition; and
    B) drying said coating on said film, wherein said coating comprises:
        a) from about 2 to 11% by weight of an antistatic copolymer, wherein said antistatic copolymer is a copolymer of:
            1) from about 60% by weight to about 85% by weight of a quaternary salt of an alkylamino acrylamide or alkylamino acrylate;
            2) from about 5% by weight to about 40% by weight of one or more acrylates; and
            3) from 0 to about 10% by weight of a crosslinker; wherein the total weight percent of components 1, 2, and 3 equals 100%;
        b) from about 0 to 0.45% by weight of an antistatic compound;
        c) from about 0.25 to 2% by weight glycidoxy silane;
        d) from about 0.3 to 2% by weight spherical silica particles having an average diameter of about 10–100 nanometers; and
        e) water, wherein the total weight percent of a–e equals 100%.

35. The method of claim 34, wherein the quaternary salt a)1) is a quaternary salt of an alkylamino acrylate of the general formula

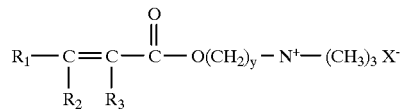

wherein $R_1$, $R_2$ and $R_3$ are the same or different and are hydrogen or an alkyl group containing 1–8 carbon atoms; y=1 to 8; and X is an anion selected from halogens, sulfates, sulfanates, alkyl sulfates, alkyl sulfanates, carbonates, alkyl carbonates, nitrates, phosphates, alkyl phosphates, and mixtures of these.

36. The method of claim 35, wherein $R_1$ and $R_2$ are hydrogen; $R_3$ is a methyl group; y is 2; and X is methyl sulfate.

37. The method of claim 34, wherein the quaternary salt a)1) is a quaternary salt of an alkylamino acrylamide of the general formula

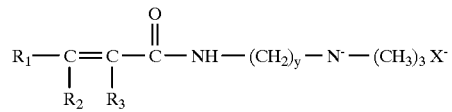

wherein $R_1$, $R_2$ and $R_3$ are the same or different and are hydrogen or an alkyl group containing 1–8 carbon atoms; y=1 to 8; and X is an anion selected from halogens, sulfates, sulfonates, alkyl sulfonates, carbonates, alkyl carbonates, nitrates, phosphates, alkyl phosphates, and mixtures of these.

38. The method of claim 37, wherein $R_1$, $R_2$ and $R_3$ are hydrogen, y=3, and X is chloride.

39. The method of claim 34, wherein said one or more acrylates selected from the group consisting of methyl acrylate, ethyl acrylate, propyl acrylate, butyl acrylate, hexyl acrylate, 2-ethyl, hexyl acrylate, octyl acrylate, methyl methacrylate, ethyl methacrylate and propyl methacrylate.

40. The method of claim 34, wherein said crosslinker is selected from the group consisting of N-methylolacrylamide; N-methylol methacrylamide; melamine or urea formaldehyde crosslinked with one or more of itaconic acid, itaconic anhydride, acrylic acid, allyl alcohol, maleic acid and maleic anhydride; acrylamide and methacrylamide crosslinked with melamine formaldehyde or urea formaldehyde; aziridines; glycoluril formaldehyde; benzoguanamines; acrylamido glycolic acid; bis-acrylamide glycol; glyoxal; formaldehyde; and diacrylamide acetic acid.

41. The method of claim 34, wherein said polymeric film is corona treated before said coating step.

42. The method of claim 34, wherein said coating is effected in-line during the manufacturing of said polymeric film.

43. The method of claim 42, wherein said in-line coating occurs intradraw during the film manufacturing process.

44. The method of claim 42, wherein said coating is applied to said film, on a dry weight basis, in a range of from 0.00305 to 0.400 g/m$^2$.

45. The method of claim 34, wherein said polymeric film is selected from the group consisting of polyester, polyolefin, polyamide, polyacetal, and polycarbonate.

46. The method of claim 45, wherein said polymeric film is biaxially oriented.

* * * * *

UNITED STATES PATENT AND TRADEMARK OFFICE
CERTIFICATE OF CORRECTION

PATENT NO. : 5,925,447
DATED : July 20, 1999
INVENTOR(S) : Gust et al.

It is certified that error appears in the above-identified patent and that said Letters Patent is hereby corrected as shown below:

Column 10,
Lines 4 (twice) and 44 (twice), "quatemary" should be -- quaternary --

Column 11,
Line 3, "add" should be -- acid --;
Line 33, "quatemary" should be -- quaternary --;
Line 53, "ore" should be -- or --;
Lines 60 through 61, "glycidoxypropylmethyidiethoxysilane" should be
-- glycidoxypropylmethyldiethoxysilane --; and
Line 64, "stearamidopropyidimethyl" should be -- stearamidopropyldimethyl --.

Column 12,
Line 1, "quatemary" should be -- quaternary --;
Line 19, "said acrylates" should be -- said acrylates are --;
Line 25, "The polymeric film claim 8" should be -- The polymeric film of claim 8 --;
Line 49, "quatermary" should be -- quaternary --;
Line 50, "mor" should be -- more --;
Line 56, "quatemary" should be -- quaternary --;
Line 58, "glyddoxy" should be -- glycidoxx --.

Column 13,
Lines 15, 45 and 46, "quatemary" should be -- quaternary --.

Column 14,
Line 1 (twice), "sulfanates" should be -- sulfonates --;
Lines 7 and 8, "quatemary" should be -- quaternary --;
Line 27, "acrylates selected" should be -- acrylates are selected --.

Signed and Sealed this

Twenty-ninth Day of January, 2002

Attest:

JAMES E. ROGAN
Attesting Officer    Director of the United States Patent and Trademark Office